United States Patent [19]

Knödler et al.

[11] 4,285,828
[45] Aug. 25, 1981

[54] PRODUCTION OF A POROUS ALUMINUM MATRIX FOR THE NEGATIVE ELECTRODE OF A GALVANIC LITHIUM ALUMINUM METAL SULFIDE ELEMENT

[75] Inventors: Reinhard Knödler, Kriftel; Gotthold Böhme, Oberursel, both of Fed. Rep. of Germany

[73] Assignee: Battelle-Institut e.V., Frankfurt am Main, Fed. Rep. of Germany

[21] Appl. No.: 45,405

[22] Filed: Jun. 4, 1979

[30] Foreign Application Priority Data

Mar. 7, 1978 [DE] Fed. Rep. of Germany ....... 2829094

[51] Int. Cl.³ .............................................. H01M 4/66
[52] U.S. Cl. .................... 252/182.1; 75/138; 204/293; 264/567; 429/218
[58] Field of Search ............ 252/182.1; 429/218; 75/138; 264/567; 204/293

[56] References Cited

U.S. PATENT DOCUMENTS

| | | | |
|---|---|---|---|
| 3,887,396 | 6/1975 | Walsh | 429/218 |
| 3,933,520 | 1/1976 | Gay et al. | 429/218 |
| 3,947,291 | 3/1976 | Yao et al. | 428/221 |
| 3,957,532 | 5/1976 | Settle et al. | 75/138 |
| 4,143,217 | 3/1979 | Joo et al. | 252/182.1 |
| 4,144,383 | 3/1979 | Joo et al. | 252/182.1 |
| 4,158,720 | 6/1979 | Kaun | 252/182.1 |

OTHER PUBLICATIONS

"High Performance Batteries for Stationary Energy Storage-" Argonne Nat. Lab. Progress Rep. Argonne, Ill., ANL-77-68, 1977.

Primary Examiner—Edward A. Miller
Assistant Examiner—Irwin Gluck
Attorney, Agent, or Firm—Fisher, Cristen & Sabol

[57] ABSTRACT

Process for the production of a porous aluminum matrix for the negative electrode of a galvanic cell, in the charged state, having lithium aluminum and metal sulfide elements (or electrodes). Aluminum powder is thoroughly mixed, e.g., by grinding, with a fine salt, which is soluble in water and which serves as an expanding agent. Coarser particles of the same expanding agent (about 100 to 500 μm in size) are then added. The matrix is finally completed by hot pressing at a temperature of 150° to 300° C. and a pressure of at least 500 bar and by the expanding agent being subsequently dissolved out of the matrix using water.

7 Claims, No Drawings

PRODUCTION OF A POROUS ALUMINUM MATRIX FOR THE NEGATIVE ELECTRODE OF A GALVANIC LITHIUM ALUMINUM METAL SULFIDE ELEMENT

BACKGROUND OF THIS INVENTION

1. Field of this Invention

This invention relates to galvanic cells (in the charged state) having lithium aluminum alloy and metal sulfide elements (electrodes) and more specifically to the production of the negative electrodes of such cells.

2. Prior Art and Related Matters

Galvanic cells of the type involved here belong to the group of high temperature cells which operate at temperatures of about 450° C. In the charged state the negative electrode consists of a lithium aluminum alloy, the positive electrode of metal sulfide, usually iron sulfide, and the electrolyte of an eutectic mixture of LiCl and KCl (e.g., see U.S. Pat. Nos. 3,887,396, 3,933,520 and 3,947,291). This kind of element is best assembled in the discharged state since the negative electrode then does not need to be prepared under a protective gas. In the discharged state this electrode consists of a porous aluminum matrix and the positive electrode of a mixture of $Li_2S$, iron and electrolyte.

A well-known method of producing the aluminum matrix for the negative electrode is to press very fine aluminum fibers (e.g., see Argonne National Laboratory, Argonne, Ill., Progress Report ANL-77-68). Such fibers are relatively expensive and therefore not desirable for manufacturing purposes.

A cheaper method of production would be to press aluminum powder with an expanding agent. When this expanding agent is dissolved out, the desired pore structure would result. However it is well known that oxide layers inevitably form on the aluminum powder and prevent the cohesion of the pressed particles.

DESCRIPTION OF THIS INVENTION

An object of this invention is to provide a simple and economic process for the production of porous aluminum matrices for the negative electrodes of galvanic cells having, in the charged state, lithium aluminum alloy and metal sulfide elements or electrodes. A further object of this invention is to also provide such a production process which avoids the above-stated problems and disadvantages of the prior art. Other objects and advantages of this invention are set out herein or are obvious herefrom to one ordinarily skilled in the art.

The objects and advantages of this invention are achieved by the process of this invention.

This invention involves a process for producing the porous aluminum matrix, wherein aluminum powder is thoroughly mixed, e.g., by grinding, with a fine salt, which is soluble in water and which serves as an expanding agent. Coarser particles of the same expanding agent (about 100 to 500 $\mu$m in size) are then added. The matrix is finally completed by hot pressing the mixture at a temperature of about 150° to 300° C. and a pressure of at least 500 bar and by subsequently dissolving out the expanding agent using water.

In the uncharged state, the negative electrode is aluminum and the positive electrode is lithium metal sulfide. In the charged state, the negative electrode is lithium aluminum (alloy) and the positive electrode is metal sulfide.

NaCl and KCl powders are advantageous as the expanding agent (and fine salt). It is also beneficial if the mixture of aluminum powder and fine expanding agent has a grain size of about 50 $\mu$m.

According to another favorable embodiment of this invention, the ratio of the weight of fine expanding agent to that of the coarse expanding agent which is added later is between 1:2 and 2:1. In a preferred embodiment of this invention the total mixture of aluminum powder and expanding agent, including the coarse expanding agent, is hot pressed at a temperature of about 200° C. and a pressure of about 1 k bar.

Further features and advantages of this invention can be found in the following detailed description. As used herein, all ratios and percentages are on a weight basis unless otherwise stated or otherwise obvious hereform to one ordinarily skilled in the art.

In a special embodiment of the process of this invention, a mechanically-stable porous aluminum matrix for the negative electrode of a galvanic cell having aluminum metal and lithium iron sulfide elements or electrodes was produced as follows:

First, 12 g of aluminum powder having a grain size of less than 42 $\mu$m was ground with 3.5 g of NaCl powder for one hour using a ball mill. A further 3.5 g of NaCl having a grain size of 100 to 500 $\mu$m was then added to this fine mixture, being mixed by hand in a mortar. Together with a current collecting screen made from nickel-chromium steel, this powder mixture was then hot pressed in a mold (48 mm in diameter) at a pressure of 1 k bar and a temperature of about 200° C. The NaCl was then dissolved out of the Al matrix using water. The electrode matrices produced in this way had about 50 to 60 volume percent pores and were mechanically stable.

A complete galvanic cell was assembled in the discharged state using the porous aluminum matrix produced in this way for the negative electrode and a hot pressed mixture of $Li_2S$, Fe and electrolyte for the positive electrode. The distance between the electrodes was about 1 cm; the theoretical capacity of the cell 10 Ah. The cell was repeatedly charged and discharged at a working temperature of 450° C. The mass-utilization for the ten-hour discharge rate amounted to up to 85 percent. After nine cycles (approx. 220 h) the experiment was interrupted, and the cell was taken apart. No change was found in the negative electrode. Thus no deterioration, or even sign of decay, of the porous-aluminum matrix had occurred during operation of the galvanic cell.

In repeating the above embodiment, KCl was used in place of NaCl with the same success.

If, however, $NH_4HCO_3$, which is well known as an expanding agent for fuel cells electrodes, is used, or if coarser aluminum powder is used, the amuminum matrices obtained are not stable. The electrodes fall apart or disintegrate around the edge. If lower temperature and pressure are used in the production process, the result is similarly bad. Furthermore, experiments have proven that the grinding of aluminum and NaCl powder did not produce satisfactory results unless coarse NaCl powder was added.

By way of summary, this invention involves a process for the production of a porous aluminum matrix for the negative electrode of a galvanic lithium aluminum metal sulfide element, characterized in that aluminum powder is thoroughly mixed, e.g., by, grinding, with a fine salt, which is soluble in water and which serves as an expanding agent, that coarser particles of the same expanding agent (about 100 to 500 μm in size) are then added, and that the matrix is finally completed by hot pressing at a temperature of 150° to 300° C. and a pressure of at least 500 bar and by the expanding agent being subsequently dissolved out using water.

We claim:

1. Process for the production of a porous aluminum matrix for the negative electrode of a galvanic cell, in the unchanged state, having aluminum and metal lithium sulfide elements or electrodes, which comprises thoroughly mixing aluminum powder with a salt, which is soluble in water and which serves as an expanding agent, the grain size of the mixture of aluminum powder and fine expanding agent being less than or equal to 50 μm, then adding coarser particles having a particle size of about 100 to 500 μm of the expanding agent to the mixture of aluminum powder and fine salt, hot pressing the resultant mixture at a temperature of 150° to 300° C. and a pressure of at least 500 bar, an aluminum matrix forming, and dissolving the expanding agent out of the resultant aluminum matrix with water, whereby the porous aluminum matrix is formed.

2. Process as claimed in claim 1 wherein NaCl or KCl powder is used as the expanding agent and fine salt.

3. Process as claimed in claim 2 wherein the ratio of the weight of the fine expanding agent to that of the coarse expanding agent is between 1:2 and 2:1.

4. Process as claimed in claim 3 wherein the total powder mixture, including the coarse portion of the expanding agent, is hot pressed at a temperature of 200° C. and a pressure of 1 k bar.

5. Process as claimed in claim 1 wherein the ratio of the weight of the fine expanding agent to that of the coarse expanding agent is between 1:2 and 2:1.

6. Process as claimed in claim 1 wherein the total powder mixture, including the coarse portion of the expanding agent, is hot pressed at a temperature of 200° C. and a pressure of 1 k bar.

7. Process as claimed in claim 1 wherein the thorough mixing is achieved by grinding together the aluminum powder and the fine salt.

* * * * *